US012057902B2

(12) United States Patent
Huang et al.

(10) Patent No.: US 12,057,902 B2
(45) Date of Patent: Aug. 6, 2024

(54) METHOD AND DEVICE OF COMMUNICATION IN A COMMUNICATION SYSTEM USING AN OPEN RADIO ACCESS NETWORK

(71) Applicant: SAMSUNG ELECTRONICS CO., LTD., Suwon-si (KR)

(72) Inventors: Qixin Huang, Beijing (CN); Zhigang Wang, Beijing (CN); Ranran Zhang, Beijing (CN); Xiaohui Yang, Beijing (CN); Chuping Dai, Beijing (CN); Di Zhang, Beijing (CN); Yan Li, Beijing (CN); Ying Wang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/946,695

(22) Filed: Sep. 16, 2022

(65) Prior Publication Data

US 2023/0014932 A1    Jan. 19, 2023

Related U.S. Application Data

(63) Continuation of application No. PCT/KR2021/003450, filed on Mar. 19, 2021.

(30) Foreign Application Priority Data

Mar. 20, 2020    (CN) .......................... 202010202200.0

(51) Int. Cl.
*H04B 7/02* (2018.01)
*H04B 7/0456* (2017.01)
*H04W 24/02* (2009.01)

(52) U.S. Cl.
CPC .......... *H04B 7/0456* (2013.01); *H04W 24/02* (2013.01)

(58) Field of Classification Search
CPC .. H04B 7/0456; H04B 7/0452; H04B 7/0413; H04B 7/0639; H04W 24/02;
(Continued)

(56) References Cited

U.S. PATENT DOCUMENTS 9,654,189 B2    5/2017   George et al.
11,075,841 B2   7/2021   Jin et al.
(Continued)

FOREIGN PATENT DOCUMENTS

CN    103763222 A  *  4/2014
CN    108123783 A     6/2018
(Continued)

OTHER PUBLICATIONS

Written Opinion (PCT/ISA237) issued by the International Searching Authority in International Application No. PCT/KR2021/003450 dated Jun. 21, 2021.
(Continued)

*Primary Examiner* — Helene E Tayong
(74) *Attorney, Agent, or Firm* — Sughrue Mion, PLLC (57) ABSTRACT

A method and apparatus for supporting a multiple-input multiple-output (MIMO) by a service management and orchestration (SMO) entity in a communication system using an open radio access network (O-RAN) includes receiving, from a first entity, first data, the first entity including at least one of an O-RAN centralized unit (O-CU) and an O-RAN distributed unit (O-DU), the first data including MIMO related information collected from the first entity, determining, based on the first data, a configuration for applying at least one of a single-user-multiple-input-multiple-output (SU-MIMO) and a multi-user-multiple-input-multiple-output (MU-MIMO), and transmitting, to a second entity that controls the first entity in the O-RAN, information on the configuration.

17 Claims, 4 Drawing Sheets

(58) Field of Classification Search
CPC . H04W 88/18; H04W 28/0289; H04W 28/24; H04W 72/54; H04W 72/53; H04L 47/788; G06N 20/00
USPC ............................................ 375/267
See application file for complete search history.

(56) References Cited

U.S. PATENT DOCUMENTS

| | | |
|---|---|---|
| 2008/0025336 A1 | 1/2008 | Cho et al. |
| 2019/0281116 A1 | 9/2019 | Yang et al. |
| 2019/0289497 A1 | 9/2019 | Rajagopal |
| 2019/0320486 A1 | 10/2019 | Khan |
| 2019/0380037 A1 | 12/2019 | Lifshitz et al. |

FOREIGN PATENT DOCUMENTS

| | | |
|---|---|---|
| CN | 108235434 A | 6/2018 |
| CN | 108990068 A | 12/2018 |
| CN | 109561444 A | 4/2019 |
| CN | 109792631 A | 5/2019 |
| CN | 110891283 A | 3/2020 |
| WO | 2019/217391 A1 | 11/2019 |

OTHER PUBLICATIONS

International Search Report (PCT/ISA/210) issued by the International Searching Authority in International Application No. PCT/KR2021/003450 dated Jun. 21, 2021.

O-RAN Alliance, "LS on O-RAN Alliance & 3GPP Coordination on O-RAN Alliance Outputs", R2-1912007, 3GPP TSG RAN WG2 #107bis, Sep. 29, 2019, (5 pages total).

ORAN Alliance: "O-RAN Working Group 2 (Non-RT RIC & AI interface)", O-RAN Specifications, O-RAN Alliance, (Jun. 1, 2019), 29 pages.

Communication dated Jul. 28, 2023 issued from the European Patent Office in EP Patent Application No. 21771658.8.

Kang Zheng et al., "Capacity Adaptive Algorithm for 5G Network Based on AI and O-RAN Architecture", Jan. 15, 2020, pp. 19-24, DOI:10.13992/j.cnki.tetas.2020.01.004.

Chunfeng Cui et al., "O-RAN Intelligent Network Platform and Edge Application", Oct. 10, 2019, pp. 26-36, DOI:10.16453/j.cnki.issn2096-5036.2019.05.003.

Linlin Cheng, "O-RAN will bring new changes to radio access network", Mar. 15, 2019, 1 page, DOI:10.13571/j.cnki.cww.2019.07.016.

3GPP TSG-RAN WG2 meeting #108, Agenda item: 2.2, Source: ETSI MCC, Document: R2-1914301, Title: Report of 3GPP TSG RAN2#107bis meeting, Chongqing, China, Oct. 2019, 283 pages.

Emmanouil Pateromichelakis et al., "End-to-End Data Analytics Framework for 5G Architecture", Roadmap to 5G: Rising to the Challenge, IEEE Access, vol. 7, Mar. 5, 2019, p. 40295-40312, DOI:10.1109/ACCESS.2019.2902984.

Communication issued on Apr. 30, 2024 by the China National Intellectual Property Administration for Chinese Patent Application No. 202010202200.0.

* cited by examiner

METHOD AND DEVICE OF COMMUNICATION IN A COMMUNICATION SYSTEM USING AN OPEN RADIO ACCESS NETWORK

CROSS-REFERENCE TO RELATED APPLICATIONS

This application is a continuation of International Application No. PCT/KR2021/003450 filed on Mar. 19, 2021, which is based on and claims priority to Chinese Patent Application No. CN202010202200.0, filed on Mar. 20, 2020 in the Chinese Patent Office, the contents of each of which being herein incorporated by reference in their entireties.

BACKGROUND

1. Field

The disclosure relates to mobile communication, and in particular to a method for dividing physical resources.

2. Description of Related Art

To meet the demand for wireless data traffic that has increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged.

In line with this, various attempts have been made to apply 5G communication systems to IoT networks to provide convergence between the 5G technology and the IoT technology.

The field of a wireless access network needs to introduce develop and design ideas that integrate with new information technology, communication technology and digital technology.

Therefore, various operators have established an Open Radio Access Network (O-RAN) industry alliance, which provides two core visions of "openness" and "intelligence", intending to build an open and intelligent wireless network by using big data, machine learning and artificial intelligence technology, and reduce the cost of the wireless network by simultaneously combining open standards, white box hardware and open source software.

SUMMARY

Provided are a method and a device for efficiently supporting multiple-input multiple-output (MIMO) in a communication system using an open radio access network (O-RAN).

In accordance with an aspect of the present disclosure, there is provided a method for supporting a multiple-input multiple-output (MIMO) by a service management and orchestration (SMO) entity in a communication system using an open radio access network (O-RAN), the method comprising receiving, from a first entity, first data, the first entity including at least one of an O-RAN centralized unit (O-CU) and an O-RAN distributed unit (O-DU), the first data including MIMO related information collected from the first entity, determining, based on the first data, a configuration for applying at least one of a single-user-multiple-input-multiple-output (SU-MIMO) and a multi-user-multiple-input-multiple-output (MU-MIMO), and transmitting, to a second entity that controls the first entity in the O-RAN, information on the configuration.

In accordance with another aspect of the present disclosure, there is provided a service management and orchestration (SMO) entity supporting a multiple-input multiple-output (MIMO) in a communication system using an open radio access network (O-RAN), the SMO entity including a controller that is configured to receive, from a first entity, first data, the first entity including at least one of an O-RAN centralized unit (O-CU) and an O-RAN distributed unit (O-DU), the first data including MIMO related information collected from the first entity, determine, based on the first data, a configuration for applying at least one of a single-user-multiple-input-multiple-output (SU-MIMO) and a multi-user-multiple-input-multiple-output (MU-MIMO), and transmit, to a second entity that controls the first entity in the O-RAN, information on the configuration.

In accordance with another aspect of the present disclosure, there is provided a method for supporting a multiple-input multiple-output (MIMO) by an open radio access network (O-RAN) entity in a communication system using an open radio access network (O-RAN), the method comprises obtaining information on a trained artificial intelligence (AI)/machine learning (ML) model deployed from the SMO entity, determining, based on the trained AI/ML model using first data, configuration for applying at least one of a single-user-multiple-input-multiple-output (SU-MIMO) and a multi-user-multiple-input-multiple-output (MU-MIMO), the first data including MIMO related information, and transmitting, to a first entity, information on the configuration, the first entity including at least one of an O-RAN centralized unit (O-CU) and an O-RAN distributed unit (O-DU).

According to another aspect of the present disclosure, there is provided an open radio access network (O-RAN) entity supporting a multiple-input multiple-output (MIMO) in a communication system using an O-RAN, the O-RAN entity including a controller is configured to obtain information on a trained artificial intelligence (AI)/machine learning (ML) model deployed from the SMO entity, determine, based on the trained AI/ML model using first data, configuration for applying at least one of a single-user-multiple-input-multiple-output (SU-MIMO) and a multi-user-multiple-input-multiple-output (MU-MIMO), the first data including MIMO related information, and transmit, to a first entity, information on the configuration, the first entity including at least one of an O-RAN centralized unit (O-CU) and an O-RAN distributed unit (O-DU).

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

As described above, to meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

An access network of the 5th generation (5G) mobile communication has characteristics of excessive services, large bandwidth, high frequency band, etc., which will lead to a smaller coverage of single station, an increase in device complexity, an increase in network construction scale, a huge network cost and a risk increase in investment return. Combined with these specific characteristics and requirements, the field of a wireless access network needs to introduce develop and design ideas that integrate with new information technology, communication technology and digital technology.

Therefore, China mobile, together with AT&T and other operators, integrates a Centralized Radio Access Network (C-RAN) alliance and an Extensible Radio Access Network (xRAN) forum, leads establishment of an Open Radio Access Network (O-RAN) industry alliance, and provides two core visions of "openness" and "intelligence", intending to build an open and intelligent wireless network by using big data, machine learning and artificial intelligence technology, and reduce the cost of the wireless network simultaneously combining open standards, white box hardware and open source software.

It is an aspect to provide a method and a device for efficiently supporting multiple-input multiple-output (MIMO) in a communication system using an open radio access network (O-RAN).

According to an aspect of the present disclosure, there is provided a method for supporting a multiple-input multiple-output (MIMO) by a service management and orchestration (SMO) entity in a communication system using an open radio access network (O-RAN), the method comprises receiving, from a first entity, first data, the first entity including at least one of an O-RAN centralized unit (O-CU) and an O-RAN distributed unit (O-DU), the first data including MIMO related information collected from the first entity, determining, based on the first data, a configuration for applying at least one of a single-user-multiple-input-multiple-output (SU-MIMO) and a multi-user-multiple-input-multiple-output (MU-MIMO), and transmitting, to a second entity that controls the first entity in the O-RAN, information on the configuration.

According to another aspect of the present disclosure, there is provided service management and orchestration (SMO) entity supporting a multiple-input multiple-output (MIMO) in a communication system using an open radio access network (O-RAN), the SMO entity including a controller that is configured to receive, from a first entity, first data, the first entity including at least one of an O-RAN centralized unit (O-CU) and an O-RAN distributed unit (O-DU), the first data including MIMO related information collected from the first entity, determine, based on the first data, a configuration for applying at least one of a single-user-multiple-input-multiple-output (SU-MIMO) and a multi-user-multiple-input-multiple-output (MU-MIMO), and transmit, to a second entity that controls the first entity in the O-RAN, information on the configuration.

According to another aspect of the present disclosure, there is provided a method for supporting a multiple-input multiple-output (MIMO) by an open radio access network (O-RAN) entity in a communication system using an open radio access network (O-RAN), the method comprising obtaining information on a trained artificial intelligence (AI)/machine learning (ML) model deployed from the SMO entity, determining, based on the trained AI/ML model using first data, a configuration for applying at least one of a single-user-multiple-input-multiple-output (SU-MIMO) and a multi-user-multiple-input-multiple-output (MU-MIMO), the first data including MIMO related information, and transmitting, to a first entity, information on the configuration, the first entity including at least one of an O-RAN centralized unit (O-CU) and an O-RAN distributed unit (O-DU).

According to another aspect of the present disclosure, there is provided an open radio access network (O-RAN) entity supporting a multiple-input multiple-output (MIMO) in a communication system using an O-RAN, the O-RAN entity including a controller that is configured to obtain information on a trained artificial intelligence (AI)/machine learning (ML) model deployed from the SMO entity, determine, based on the trained AI/ML model using first data, a configuration for applying at least one of a single-user-multiple-input-multiple-output (SU-MIMO) and a multi-user-multiple-input-multiple-output (MU-MIMO), the first data including MIMO related information, and transmit, to a first entity, information on the configuration, the first entity including at least one of an O-RAN centralized unit (O-CU) and an O-RAN distributed unit (O-DU).

According to another aspect of the present disclosure, there is provided a method for dividing physical resources, the method comprising receiving data, wherein the received data comprises receiving first data through an interface between a service management and orchestration entity and a functional node in an O-RAN network functional entity; and receiving second data through an open interface with an external system; inferring predicted spectral efficiency and determining a physical resource configuration policy of a slice based on the first data and the second data; and issuing the physical resource configuration policy of the slice.

According to another aspect of the present disclosure, there is provided a method for dividing physical resources, the method comprising receiving data, wherein the receiving data comprises receiving a first part of first data and second data through an interface between a service management and orchestration entity and a functional node in an O-RAN network functional entity; and receiving a second part of the first data through an interface inside the functional node in the O-RAN network functional entity; inferring predicted spectral efficiency and determining a physical resource allocation policy of a slice based on the first data and the second data; and issuing the physical resource configuration policy of the slice.

In some embodiments, the first data may be received from the functional node in the O-RAN network functional entity for estimating and predicting spectral efficiency.

In some embodiments, the first data may include at least one of following types of data: cell capability information data, user capability information data, cell statistical information data, user statistical information data, and configuration information.

In some embodiments, for each cell of each slice, for any one of MU-MIMO and SU-MIMO transmission modes, the cell capability information data may include at least one of following data: data about whether uplink/downlink transmission is supported, the highest number of supported layers, data about whether a high-reliability MCS level table is supported, whether SRS is supported, whether PMI is supported.

In some embodiments, for each cell of each slice, the cell capability information data may include information about a number of users of different user capability levels.

In some embodiments, for each cell of each slice, for any one of MU-MIMO and SU-MIMO transmission modes, the cell statistical information data may include at least one of following data: average number of uplink/downlink transmission layers, average number of uplink/downlink PRBs, average uplink/downlink PRB utilization rate, average uplink/downlink throughput, and average uplink/downlink MCS level.

In some embodiments, for each user, for any one of MU-MIMO and SU-MIMO transmission modes, the user statistical information data may include at least one of following data: average number of uplink/downlink transmission layers, average number of uplink/downlink physical resource blocks (PRBs), average uplink/downlink PRB utilization rate and average uplink/downlink throughput.

In some embodiments, the configuration information may include at least one of following data: a MCS level table, beam configuration information, and whether data sharing between multiple base stations is supported.

In some embodiments, any one of the data may be optional or mandatory.

According to another aspect of the present disclosure, there is provided an apparatus for dividing physical resources of network slices based on O-RAN, the apparatus being configured to receive data, the receiving data comprising receiving first data through an interface between a service management and orchestration entity and a functional node in an O-RAN network functional entity; and receiving second data through an open interface with an external system, wherein the apparatus further comprises a radio access network intelligent controller configured to infer predicted spectral efficiency and determine a physical resource configuration policy of a slice based on the first data and the second data, and transmit the physical resource configuration policy of the slice.

According to another aspect of the present disclosure, there is provided an apparatus for dividing physical resources, the apparatus comprising a radio access network intelligent controller configured to: receive a first part of first data and second data through an interface between a service management and orchestration entity and a functional node in an O-RAN network functional entity; and receive a second part of the first data through an interface inside the functional node in the O-RAN network functional entity; infer predicted spectral efficiency and determine a physical resource configuration policy of a slice based on the first data and the second data, and transmit the physical resource configuration policy of the slice; a functional node in a network functional entity for receiving the physical resource configuration policy of the slice.

According to another aspect of the present disclosure, there is provided a computer device for dividing physical resources, the computer device comprising a memory and a processor, wherein the memory has stored thereon instructions, which when executed by the processor, implement one of the above method.

It is to be understood that both the foregoing general description and the following detailed description are exemplary and are intended to provide further explanation of the claimed technology.

Before undertaking description of various embodiments below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

The block diagrams of equipment, apparatus, devices and systems involved in the present disclosure are only taken as illustrative examples and are not intended to require or imply that they must be connected, arranged and configured in the manner shown in the block diagram. As will be recognized by those skilled in the art, these equipment, apparatus, devices and systems can be connected, arranged and configured in any manner. Words such as "including", "containing", "having" and so on are open words, which mean "including but not limited to" and can be used interchangeably with it. Words "or" and "and" used herein refer to words "and/or" and can be used interchangeably with it, unless the context clearly indicates otherwise. Word "such as" used herein refers to phrase "such as but not limited to" and can be used interchangeably with it.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

In order to make aspects, technical schemes and advantages of the present disclosure more clear, exemplary embodiments according to the present disclosure will be described in detail below with reference to the accompanying drawings. The described embodiments are only a part of the embodiments of the present disclosure, but not all of the embodiments of the present disclosure. It should be understood that the present disclosure is not limited by the example embodiments described here.

Figure 1:
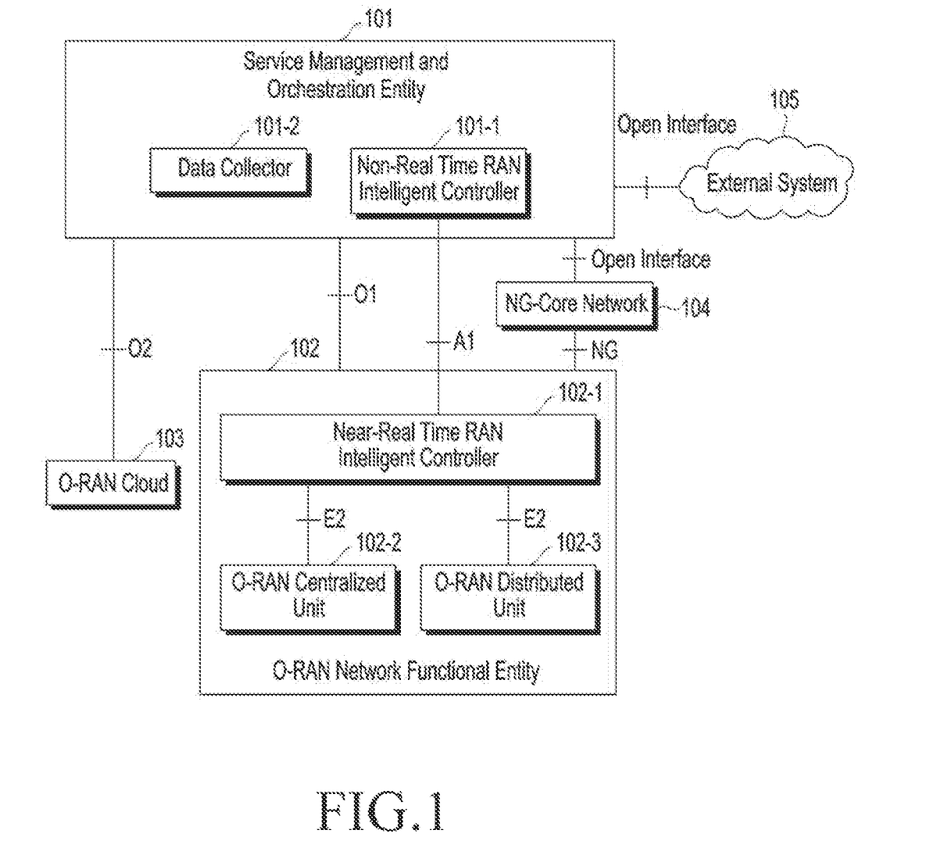
FIG. 1 illustrates an overall framework of an Open Radio Access Network (O-RAN), according to an embodiment.

FIG. 1 illustrates an overall framework of an Open Radio Access Network (O-RAN), according to an embodiment. The overall architecture of the O-RAN will be discussed with reference to FIG. 1.

The design principle of the overall architecture of the O-RAN is: building on the basis of the Centralized Unit (CU)/Distributed Unit (DU) architecture and functional virtualization of the wireless network, introducing a reference design of open interface and open hardware, and optimizing wireless control flow by artificial intelligence. The overall architecture of the O-RAN includes the following entities:

a service management and orchestration (SMO) entity 101: the SMO entity 101 is an entity for providing various management services and network management functions, which includes a Non-Real time RAN intelligent controller 101-1 (Non-RT RIC) and a data collector 101-2 (Collector);

Non-RT RIC 101-1: the Non-RT RIC 101-1 has functions of microservice and policy management, wireless network analysis, and Artificial Intelligence (AI)/ Machine Learning (ML) model training, etc. In some embodiments, the microservice may be a service that can deploy application(s) and/or service(s) in a cloud network. The trained AI model may be directly deployed in the Non-RT RIC 101-1 or deployed in the Near-Real Time RAN Intelligent Controller 102-1 (Near-RT RIC) through an A1 interface for inference and executing. The Non-RT RIC 101-1 may process non-real time services, that require a delay, such as the microservice and policy management, the wireless network analysis, and the AI/ML model training, etc.

data collector 101-2: a functional entity for collecting internal data and external data in the SMO entity 101 (Collector 101-2 does not refer to an O-RAN specific entity, but only refers to a functional entity capable of collecting the internal data and the external data);

an O-RAN network functional entity 102: compared with a network functional entity in a non-O-RAN system, a Near-RT RIC 102-1 is introduced into the O-RAN network functional entity 102. The entities or functions related to the present disclosure in the internal functional nodes of the O-RAN network functional entity 102 also include: at least one of an O-RAN Centralized Unit 102-2 (O-CU) and an O-RAN Distributed Unit 102-3 (O-DU);

Near-RT RIC 102-1: realizing near-real time control and optimization of wireless resources through near-real time data collection and processing. The Near-RT RIC 102-1 may also include training, inferring and updating of Artificial Intelligence (AI)/ Machine Learning (ML) models. The Near-RT RIC 102-1 may process near-real time services with a delay less than that of the non-real time services. The near-real time services may be services such as training, inferring and updating of AI/ML models, and optimization of wireless resources, etc.

O-CU 102-2: a logical node carrying/hosting a control plane part of RRC and PDCP protocols. Compared with a centralized unit (CU) in the non-O-RAN system, the O-CU 102-2 additionally supports the E2 interface.

O-DU 102-3: a logical node carrying/hosting a RLC/MAC/High-PHY layer. The PHY layer may be divided into the High-PHY layer and a Low-PHY layer in the O-RAN based system. For example, the High-PHY and Low-PHY layers may refer to 3GPP TR 38.801. Compared with a distributed unit (DU) in the non-O-RAN system, the O-DU 102-3 additionally supports the E2 interface.

O-RAN Cloud 103 (O-Cloud): The O-Cloud 103 (O-Cloud) is a cloud computing platform, which is composed of physical infrastructure nodes meeting requirements of the O-RAN to carry data of related O-RAN functions (such as Near-RT RIC, O-CU and O-DU) and support software components (such as operating systems, virtual machine monitors, container runtime, etc.) and appropriate management and orchestration functions.

a 5G core network 104 (NG-core);

an external system 105: the external system 105, such as servers of various applications APPs, provides enrichment data for the SMO entity.

The overall architecture of the O-RAN also includes following interfaces for communication among the above entities:

an O1 interface: the O1 interface is used to connect the SMO entity 101 and functional entities in the O-RAN network functional entity 102 (a connecting line in FIG. 1 is only schematic, and the O1 interface has a connection relationship with each functional entity in the O-RAN network functional entity 102);

an O2 interface: the O2 interface is used to connect the SMO entity 101 and the O-Cloud 103;

an A1 interface: the A1 interface is used to connect the Non-Real time RAN intelligent controller 101-1 in the SMO entity 101 and the Near-Real Time RAN Intelligent Controller 102-1 in the O-RAN network functional entity 102. The A1 interface uses an A1 policy to guide the Near-Real Time RAN Intelligent Controller 102-1, so that the O-RAN network functional entity 102 may better realize functions such as radio resource management. Herein, the A1 policy is created, modified and/or deleted by the Non-Real time RAN intelligent controller 101-1 in the SMO entity 101. Data from the Non-Real time RAN intelligent controller 101-1 to the Near-Real Time RAN Intelligent Controller 102-1 may be transmitted through the A1 interface. Furthermore, Feedback information from the Near-Real Time RAN Intelligent Controller 102-1 to the Non-Real time RAN intelligent controller 101-1 may be also transmitted through the A1 interface, so that the Non-Real time RAN intelligent controller 101-1 may monitor the use of the A1 policy.

an E2 interface: the E2 interface is an interface used to connect the Near-RT RIC 102-1 with the O-CU 102-2 and the O-DU 102-3. With the E2 interface, the Near-RT RIC 102-1 may not only collect measurement information of the O-RAN network functional entity 102, but also transmit control commands to a base station. The base station may include at least one of the O-CU 102-2, the O-DU 102-3 and a radio unit (RU) (not depicted). The RU may transmit and receive a radio signal, and the RU may be located at a cell site. The RU may include the Low-PHY layer in the O-RAN based system. The RU may also be referred to an O-RAN radio unit (O-RU).

The basic architecture and communication process of 5G defined by 3GPP in Release 15/16 may include the related concepts of a network slice/network slicing. The basic explanation of the network slice/network slicing may refer to 3GPP TS 38.300/TS 23.501 standards. Specifically, management and orchestration of 5G communication network defined in 3GPP specification includes the related concepts of the network slice. Other standard groups, such as Global System for Mobile Communications Association (GSMA), European Telecommunication Standards Institute (ETSI) network functions virtualization (NFV)-Management and Orchestration (MANO), Zero-touch network and Service Management (ETSI ZSM) and Open Network Automation Protocol (ONAP), focus on other different aspects of the network slice. Specifically, a physical network may be divided into multiple virtual logical networks. Herein, each virtual logical network is defined as one network slice. Each network slice supports one type of services, and thus these network slices enable the same physical network to support different types of services. Since the 5G network will support diverse services, the network slice will play a key role in the 5G network. The network slice or slice mentioned in the present disclosure specifically includes a network slice controllable by the O-RAN, a network sub-slice of a RAN layer, or a network slice instance.

A FIRST EMBODIMENT

The first embodiment relates to a communication method in a communication system using the O-RAN.

Figure 2:
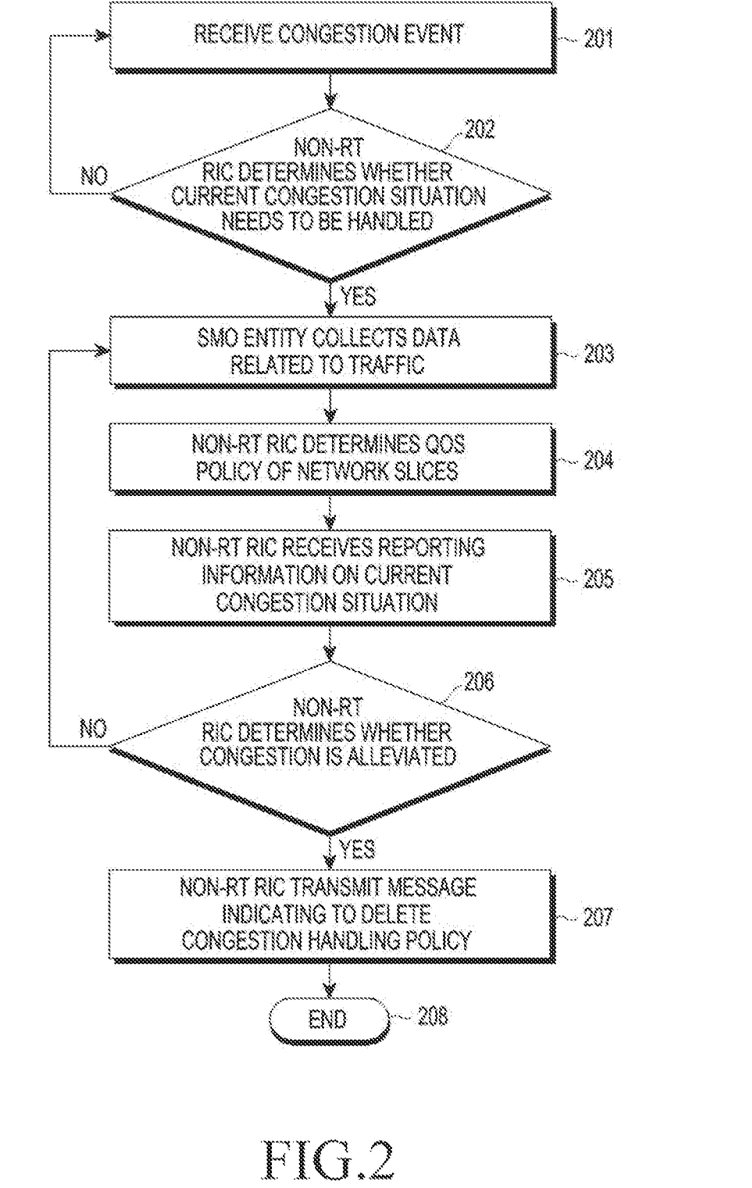
FIG. 2 illustrates a flow chart of a communication method in a communication system using the O-RAN, according to an embodiment.

FIG. 2 illustrates a flow chart of a communication method in a communication system using the O-RAN, according to an embodiment. Next, the communication method will be described with reference to FIG. 1 and FIG. 2.

In step 201, the Non-RT RIC 101-1 of the SMO entity 101 receives a congestion event from an O-RAN network functional entity 102.

In step 202, the Non-RT RIC 101-1 determines whether current congestion situation needs to be handled. For example, the Non-RT RIC 101-1 determines whether current congestion situation needs to be handled by adjusting a Quality of Service (QoS) policy of the network slices based on the congestion event.

In step 203: If it is determined that the current congestion situation needs to be handled (Step 202, YES), Collector 101-2 of the SMO entity 101 collects data related to traffic. The data related to the traffic may include internal data and external data. Herein, the internal data refers to data reported to the Collector 101-2 of the SMO entity 101 from the O-RAN network functional entity 102, and the external data refers to data on an external system 105. For example, in some embodiments, the external data may be messages related to natural disasters and the like on an application server that will cause network congestion.

In step 204, the Non-RT RIC 101-1 determines a QoS policy of network slices. For example, the Non-RT RIC 101-1 may train AI/ML models based on the data related to traffic to determine the QoS policy of the network slices, and may configure the determined the QoS policy of the network slices to the O-RAN network functional entity 102.

In step 205, the Non-RT RIC 101-1 receives reporting information on the current congestion situation from the O-RAN network functional entity 102 through an O1 interface.

In step 206, the Non-RT RIC 101-1 determines whether congestion is alleviated based on the current congestion situation and a preset condition on congestion alleviation. If the congestion situation is alleviated (step 206, YES), the method proceeds to step 207; if the congestion situation is not alleviated (step 206, NO), the method proceeds to step 203.

In step 207, the Non-RT RIC transmits, to the O-RAN network functional entity 102, a message including information indicating to delete the congestion handling policy. For example, the Non-RT RIC may transmit, to the O-RAN network functional entity 102, a message including information indicating to delete the QoS policy of the network slices.

In step 208: The O-RAN network functional entity 102 deletes the QoS policy of the network slices, and the adjustment process of a policy for dividing physical resources of the network slices triggered by the congestion event ends.

It can be seen that in the above O-RAN scheme, the congestion is relieved by adjusting the policy for dividing physical resources of the network slices based on ways of the congestion performed by the non-RT RIC 101-1. In an embodiment, this method may have certain limitations in 5G scenarios, which are described as follows.

5G defines three main application scenarios: Enhance Mobile Broadband (eMBB), Ultra Reliable Low Latency Communications (uRLLC) and/or Massive Machine Type Communications (mMTC).

In the definition of 5G protocol, the coexistence of three application scenarios may be supported by network slicing technology, that is, a same network entity supports multiple network slices, herein, each network slice corresponds to one application scenario. At the same time, 5G network also supports a customized network slice, that is, a specific network slice may be defined according to specific service and implementation needs.

In actual deployment, different network slices are generally used in different scenarios, and serve different types of terminal devices (or user equipments (UEs)) and adopt different transmission methods. For example, eMBB application scenarios mainly refer to consumer-level applications of types of mobile Internet high-traffic, such as 4K/8K high-definition video, Augmented Reality/Virtual Reality (AR/VR), and 3D holography, etc. This scenario has high requirements on communication abilities and transmission rate of a UE, so this scenario usually supports UEs to adopt a multi-user-multiple-input-multiple-output (MU-MIMO) transmission mode, but also supports some UEs to adopt single-user-multiple-input-multiple-output (SU-MIMO) transmission according to different communication capabilities and QoS requirements of a UE. For another example, in the URLLC scenario, the UE has low requirements on transmission rate, but has high requirements on transmission delay and transmission reliabilities, and thus SU-MIMO transmission is usually adopted.

For the MU-MIMO and the SU-MIMO, the maximum transmission capacity supported by the base station will directly affect spectrum efficiency of the base station and further affect the peak rate. For example, in actual deployment, the MU-MIMO generally supports up to 8 layers or up to 16 layers, and the SU-MIMO generally supports up to 4 layers, and thus the spectrum efficiency of transmission adopting the MU-MIMO is significantly higher than that adopting SU-MIMO.

Furthermore, for the MU-MIMO and the SU-MIMO, a feedback mode of channel quality may also significantly affect the spectral efficiency. For example, the MU-MIMO based on a Sounding Reference Signal (SRS) has high spectral efficiency at low velocity. On the contrary, at a high velocity, the performance is lower than that of the SU-MIMO based on a Pre-coding Matrix Index (PMI).

Furthermore, for the MU-MIMO and the SU-MIMO, coding efficiency is also significantly affect the spectral efficiency. For example, network slices supporting the URLLC scenarios often use a high-reliability Modulation and Coding Scheme (MC S), but at the expense of the spectrum efficiency.

It can be seen that various factors, including the maximum transmission capacity supported by the base station, the feedback mode of channel quality, and the efficiency of the coding mode, and the like, may lead to the difference in the spectrum efficiency among the slices.

In some embodiments, the adjustment of the policy for dividing physical resources of the network slices may be triggered by occurrence of the congestion. This technical scheme has the following limitations: on the one hand, the difference in the spectrum efficiency among the slices is not considered, which leads to an unreasonable policy for dividing physical resources of the network slices and reduces the overall performance; on the other hand, by the Non-RT RIC 101-1 of the SMO entity 101, the Non-RT RIC 101-1 of the SMO entity 101 may adjust the policy for dividing physical resources of the network slices in a non-real time way, which has a low real-time performance and is not suitable for scenarios with rapidly changing wireless environment.

A SECOND EMBODIMENT

In the second embodiment, there is provided an method in a communication system using the O-RAN. Specifically, relevant data is collected through an internal interface (e.g., O1 interface or A1 interface) and an external interface (e.g., an interface between a SMO entity 101 and an external system 105), and a long-term configuration policy for dividing physical resources of slices is determined by training and deploying AI/ML models by a non-RT RIC 101-1 of the SMO entity 101.

Figure 3:
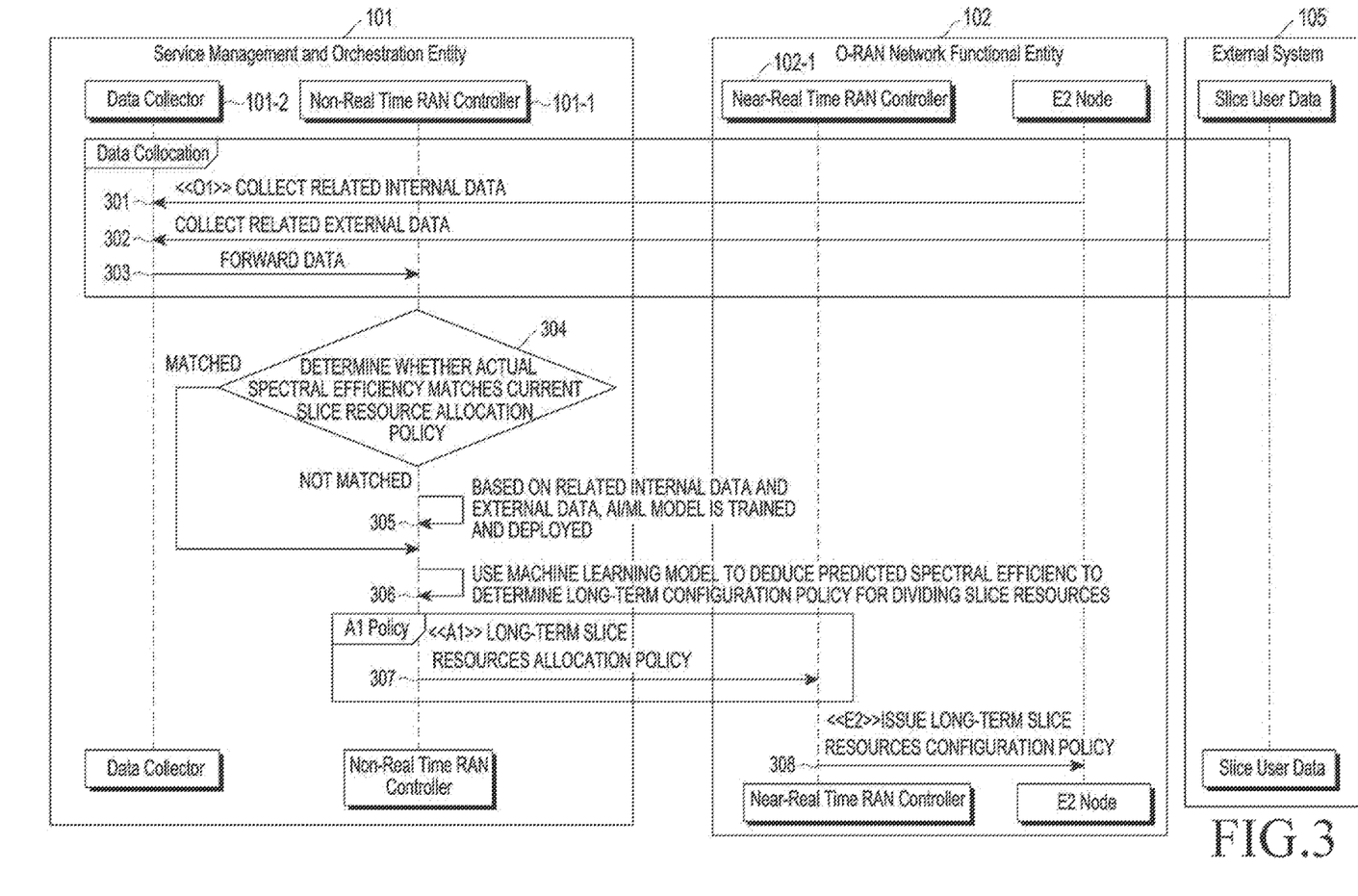
FIG. 3 illustrates a flow chart of another communication method in a communication system using the O-RAN, according to an embodiment.

FIG. 3 illustrates a flow chart of another communication method in a communication system using the O-RAN, according to an embodiment. With reference to FIG. 3, the method in the second embodiment will be described below.

The execution of the method in a communication system using the O-RAN may be triggered by configuration and/or periodically.

Specifically, a network slice resource division adjustment function may be initiated by a way of configuration triggering, for example, according to requirements of slice service providers or customers.

Particularly, for the way of periodically triggering, for example, initiating the slice resource division adjustment function by a preset period, the Non-RT RIC 101-1 of the SMO entity 101 can support the preset period and Near-RT RIC 102-1 of the O-RAN network functional entity 102 can support the preset period which may be set to various levels such as, for example, a 10 ms level.

In the first embodiment, the start of the adjustment process of dividing physical resources of the network slices is triggered by the congestion event. An interval between occurrences of triggering events may be several days, several months, or several hours. Therefore, if the network transmission performance is low, but there is no congestion event, the adjustment of dividing physical resources of the network slices will not be triggered in time. The technical scheme of the second embodiment has following technical advantages: with the adjustment of dividing physical resources of the network slices may be triggered by configuration and/or triggered periodically, more timely slice resource optimization is realized, thereby solving transmission problems in the network in a more timely manner, reducing a possibility of occurrence of the congestion and improving an overall transmission performance of the network.

When a triggering condition is met, for example, a new period may start or the network slice service provider may adjust a physical resource policy of network slices, the following steps are performed.

In step 301: internal data is collected by Collector 101-2 of the SMO entity 101. The internal data refers to data from an internal functional node of an O-RAN network functional entity 102, for which FIG. 3 takes an E2 node corresponding to at least one of O-CU 102-2 or O-DU 102-3 as an example. The internal data may include at least one of the following three types of data: (1) capability information (data); (2) statistical information (data); and (3) configuration information (data). Herein, Table 1 represents specific examples of the capability information data. Table 2 represents specific examples of the statistical information data, and Table 3 represents specific examples of the configuration information data. Tables 4-7 represent definitions of some of the statistical information data. Tables 1-7 are provided below.

It should be noted that the collection of the internal data is not necessarily performed by the Collector 101-2, but may also be performed by other functional entities in the SMO entity 101 based on different system architectures. Therefore, it can also be understood that the internal data may be collected by the SMO entity 101. The explanation herein is not only applicable to step 301 of collecting the internal data, but also applicable to the following steps performed by the Collector 101-2. The description made to entities in the present disclosure is non-limiting.

In step 302: external data related to spectrum efficiency prediction of network slices is collected by the Collector 101-2. The external data refers to data on an external system 105. Specifically, the external data may include at least one of the following data:
  information used to help the O-RAN system obtain movement situation of a UE. For example, the information may include location information of the UE, location information of the base station, real-view maps, etc.;
  related information used to help the O-RAN system obtain service traffic of the UE. For example, the related information may include a mobile application being initiated by the UE, the desensitized information of call duration statistics of the UE, etc.;
  information used to help the O-RAN system obtain channel quality of the UE, such as vegetation, river distribution, etc.

The technical scheme in the second embodiment including the above step 302 has the following technical advantages: the functional node in the O-RAN network functional entity 102 reports the related internal data (the capability information data, the statistical information data, and the configuration information data) and external data to the Collector 101-2, which is not limited to internal data and external data related to traffic and congestion, thus providing a basis for realizing more accurate and real-time network slice resource optimization, thereby improving the overall transmission performance of the system.

In step 303, the internal data and the external data is forwarded from the Collector 101-2 to the Non-RT RIC 101-1 in the SMO entity 101.

In step 304, the Non-RT RIC 101-1 determines whether an actual spectral efficiency of the network slices matches a current network slice resource configuration policy, based on the actual spectral efficiency of the network slice calculated through the related internal data. If the actual spectral efficiency doesn't match the current network slice resource configuration policy, the Non-RT RIC 101-1 determines that an AUML model needs to be trained or retrained, and proceeds to step 305. If the actual spectral efficiency matches the current network slice resource configuration policy, the Non-RT RIC 101-1 determines that an AUML model doesn't need to be trained or retrained, skips step 305 and directly proceeds to step 306.

In step 305, the AUML model is trained based on the related internal data and external data by the Non-RT RIC 101-1, and the trained AUML model is deployed in the Non-RT RIC 101-1.

In step 306, based on the related internal data and external data, the Non-RT RIC 101-1 uses the trained AI/ML model to infer a long-term prediction of spectral efficiency of the network slices, and determines a long-term configuration policy for dividing physical resources of the network slices based on the long-term prediction of the spectral efficiency of the network slices.

Specifically, the long-term configuration policy for dividing physical resources of the network slices includes physical resource block (PRB) allocation policy, transmission mode optimization policy, and slice attributes defined in document NG.116-v1.0 to v4.0 which relates to generic network slice template and is provided by the GSMA. The transmission mode optimization policy comprises determination for applying to the MU-MIMO and the SU-MIMO separately and collectively.

In the first embodiment, the Non-RT RIC 101-1 trains the AI/ML model based on the data related to traffic to adjust the QoS policy of the network slices. Furthermore, the adjusted QoS policy of the network slices affects allocation policy of physical resources of the network slices. This solution in the first embodiment adjusts the physical resources of the network slices indirectly, which may lead to uncertainty in the division of the physical resources of the network slices. The technical solution in the second embodiment has the following technical advantages: the long-term prediction of spectrum efficiency of the network slices is performed based on the related internal data and external data in the Non-RT RIC 101-1 of the SMO entity 101, and the long-term configuration policy for dividing physical resources of the network slices is determined based on a prediction result, so that the policy for dividing physical resources of the network slices may better achieve the expected effect, thereby increasing the certainty of physical resource optimization of slices.

In step 307, the Non-RT RIC 101-1 of the SMO entity 101 transmits the determined long-term configuration policy for dividing physical resources of the network slices to the Near-RT RIC 102-1 of the O-RAN network functional entity 102 through an A1 interface.

In step 308, the Near-RT RIC 102-1 forwards, through an E2 interface, the received long-term configuration policy for dividing physical resources of the network slices to a functional node (corresponding to at least one of O-CU 102-2 or O-DU 102-3) in the O-RAN network functional entity 102, for which FIG. 3 takes an E2 node as an example.

The technical scheme in the second embodiment has the following technical advantages: the Non-RT RIC 101-1 directly determines the long-term configuration policy for dividing physical resources of the network slices, without deploying the AI/ML model on the Near-RT RIC 102-1, thus simplifying the processing of the Near-RT RIC.

A THIRD EMBODIMENT

In the third embodiment, there is provided another method in a communication system using the O-RAN. Specifically, data is collected through an internal interface (e.g., O1 interface or A1 interface) and an external interface (e.g., an interface between an SMO entity 101 and an external system 105), a long-term configuration policy for dividing physical resources of the network slices is determined by training and deploying an AI/ML model by the non-RT RIC 101-1 of the SMO entity 101, near-real time internal data is introduced through an E2 interface, and the near-real time configuration policy for dividing the physical resources of the network slices is further determined by using the AI/ML model deployed on near-RT RIC 102-1 and the long-term configuration policy for dividing the physical resources of the network slices.

Figure 4:
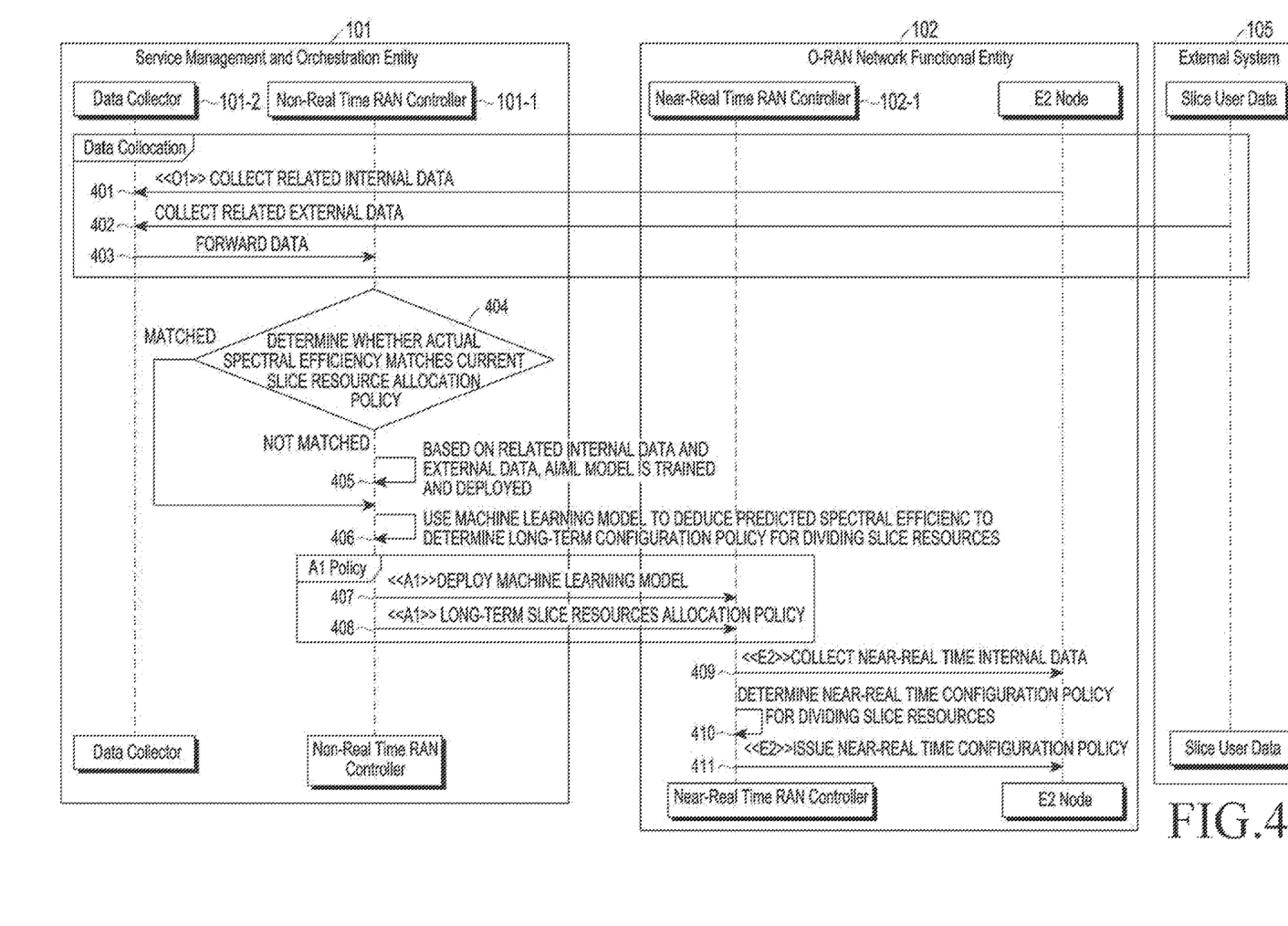
FIG. 4 illustrates a flowchart of another communication method in a communication system using the O-RAN, according to an embodiment.

FIG. 4 illustrates a flowchart of another communication method in a communication system using the O-RAN, according to an embodiment. With reference to FIG. 4, the communication method in the third embodiment will be described below.

Since some of the steps of the second embodiment and the third embodiment are the same, a repeated description thereof is omitted for conciseness. Specifically, steps 401 to 406 correspond to steps 301 to 306.

In step 407, the Non-RT RIC 101-1 of the SMO entity 101 deploys the trained AI/ML model to the Near-RT RIC 102-1 of the O-RAN network functional entity 102 through the A1 interface.

In step 408, the Non-RT RIC 101-1 transmits the determined long-term configuration policy for dividing physical resources of the network slices to the Near-RT RIC 102-1 through the A1 interface.

In step 409, the Near-RT RIC 102-1 collects near-real time internal data. The near-real time internal data refers to near-real time data from a functional node in the O-RAN network functional entity 102, for which FIG. 4 takes an E2 node corresponding to at least one of O-CU 102-2 or O-DU 102-3 as an example. The near-real time internal data may include at least one of the following three types of data: (1) capability information (data); (2) statistical information (data); and (3) configuration information (data). Herein, Table 1 represents specific examples of the capability information data. Table 2 represents specific examples of the statistical information data, Table 3 represents specific examples of the configuration information data. Tables 4-7 represent definitions of some of the statistical information data.

In step 410, based on the near-real time internal data and the received long-term allocation policy of network slice resources, the Near-RT RIC 102-1 infers near-real time prediction of spectral efficiency of the network slices by using the AI/ML model, and determines near-real time configuration policy for dividing the physical resources of the network slices based on the near-real time prediction of the spectral efficiency of the network slices.

Specifically, the near-real time configuration policy for dividing physical resources of the network slices includes at least one of PRB allocation policy, transmission mode optimization policy, and slice attributes defined in document NG.116-v1.0 to v4.0 which relates to generic network slice template and is provided by the GSMA.

In step 411, the Near-RT RIC 102-1 issues, through an E2 interface, the near-real time configuration policy for dividing physical resources of the network slices to a functional node (corresponding to at least one of O-CU 102-2 or O-DU 102-3) in the O-RAN network functional entity 102, for which FIG. 4 takes the E2 node as an example.

The technical scheme in the third embodiment has the following technical advantages: statistical time lengths of statistics of the O1 interface and the E2 interface are different. For example, the statistics of O1 interface may be counted in seconds and reported periodically. The statistics of E2 interface may be counted and reported within 10 ms to 1000 ms. Compared with the O1 interface, the E2 interface has a shorter statistical period, so that more real-time related internal data may be obtained. For a situation where only the Non-RT RIC 101-1 makes non-real-time policy adjustment, the Non-RT RIC 101-1 has low real-time performances and is not suitable for scenarios where the wireless environment changes rapidly. Therefore, the Near-RT RIC is introduced to perform the near-real time policy adjustment, so that the physical resources optimization may in real time with the wireless communication environment changes.

In the above description, the related near-real time internal data includes following three types of data: (1) capability information data; (2) statistical information data; and (3) configuration information data. Herein, Table 1 represents specific examples of the capability information data. Table 2 represents specific examples of the statistical information data, and Table 3 represents specific examples of the configuration information data. Tables 4-7 represent definitions of some of the statistical information data.

In the embodiments of the present disclosure, the related internal data are explained in a non-exhaustive way. Specifically, some data types and definitions related to the spectrum efficiency prediction of the network slices are given in Tables 1 to 7. It should be noted that this is only an exemplary explanation of the present disclosure, not a restrictive explanation. All relevant parameters and configurations that may be used for the spectrum efficiency prediction of the network slices may be substituted into the embodiment of the present disclosure as the internal data. Furthermore, all data may be set as optional or mandatory.

TABLE 1

| Capability Information Data | |
|---|---|
| Cell Capability Information (for each cell of each slice) | whether uplink MU-MIMO transmission mode is supported; whether downlink MU-MIMO transmission mode is supported; whether uplink SU-MIMO transmission mode is supported; whether downlink SU-MIMO transmission mode is supported; whether MU-MIMO transmission based on SRS is supported; whether MU-MIMO transmission based or PMI is supported; whether SU-MIMO transmission based on SRS is supported; whether SU-MIMO transmission based on PMI is supported. The following statistics apply to the MU-MIMO and the SU-MIMO separately and collectively: Maximum number of layers supported; whether a high-reliability MCS level table is supported; |

TABLE 1-continued

Capability Information Data

| | |
|---|---|
| User Capability Information (for each cell of each slice) | The following statistics apply to the MU-MIMO and the SU-MIMO separately and collectively: Information on a number of users with different user capability levels, for example, a number of users supporting the SRS capability of one-transmit and one-receive; a number of users supporting the SRS capability of one-transmit and two-receive; a number of users supporting the SRS capability of one-transmit and four-receive; a number of users supporting the capability of frontloading two-symbol demodulation reference signals (DMRS); a number of users supporting the capability of type 1 codebook feedback: a number of users supporting the capability of type 2 codebook feedback, etc. |

TABLE 2

Statistical Information Data

| | |
|---|---|
| Cell Statistical Information (for each cell of each slice) | The following statistics apply to the MU-MIMO and the SU-MIMO separately and collectively: average number of uplink/downlink transmission layers (see table 4 for detailed calculation method), average number of uplink/downlink PRB (see table 5 for detailed calculation method), average uplink/downlink PRB utilization rate (see table 6 for detailed calculation method), average uplink/downlink throughput (see table 7 for detailed calculation method), and average uplink/downlink MCS level |
| User Statistical Information (for each user) | The following statistics apply to the MU-MIMO and the SU-MIMO separately and collectively: average number of uplink transmission layers, average number of downlink transmission layers, average number of uplink PRBs, average number of downlink PRBs, average uplink PRB utilization rate, average downlink PRB utilization rate, average uplink MU-MIMO throughput and average downlink throughput. |

TABLE 3

Configuration Information Data

| | |
|---|---|
| Configuration Information | The following statistics apply to the MU-MIMO and the SU-MIMO separately and collectively: a MCS level table, beam configuration information, whether multiple base station layer pooling is supported, and configuration related to the multiple base station layer sharing, etc. the multiple base station layer pooling is supported, that is, multiple cells share a group of DU resources, and thus the maximum number of transmission layers supported by the multiple cells is fixed, and the system may dynamically determine the maximum number of transmission layers of each cell. The configuration related to the multiple base station layer pooling includes the maximum number of total layers of shared cells, the maximum number of MU cells, the maximum number of layers of MU cells, and the maximum number of layers of SU cells, etc. |

TABLE 4

Statistics of Average Number of Uplink/Downlink Layers for MU MIMO and SU MIMO Respectively and Collectively

| | |
|---|---|
| Protocol layer: | MAC layer |
| Use cases: | Physical Resources Division of Network Slice |
| Value range: | An integer between 0 and 50 |
| Optional/Mandatory: | Optional |
| Calculation method | In the O1 or E2 measurement and counting period, calculate an average value of the number of uplink/downlink layers scheduled by uplink/downlink monitoring slices in each Transmission Time Interval (TTI), which is obtained according to statistics of actual transmission situation of a cell, the reference point is a service access point between MAC and L1. |
| Definition | $L_{avg}(T) = L(T)/P(T)$ (Expression 1) Herein, T represents a measurement and counting period; $L_{avg}(T)$ represents the average number of uplink/downlink layers scheduled in each TTI in the measurement and counting period; L(T) represents the cumulative number of uplink/downlink layers during all TTIs in the measurement and counting period; P(T) represents the number of TTIs occupied by uplink/downlink in the measurement and counting period. Herein, when there are a plurality of different uplink/downlink layers in one TTI, when calculating the cumulative number of layers, the maximum number of layers among the different uplink/downlink layers is taken. |

TABLE 5

Statistics of Average Number of Uplink/Downlink PRBs For MU MIMO and SU MIMO Respectively and Collectively

| | |
|---|---|
| Protocol layer: | MAC layer |
| Use cases: | Physical Resource Division of Network Slices |
| Value range: | An integer between 0 and 100 |
| Optional/Mandatory: | Optional |
| Calculation method | In the O1 or E2 measurement and counting period, calculate an average value of the number of PRBs used in uplink/downlink monitoring slices in each TTI, which is obtained according to statistics of actual transmission situation of a cell, the reference point is a service access point between MAC and L1. |
| Definition | $PRB_{avg}(T) = PRB_{total}(T)/P(T)$ (Expression 2) Herein, T represents a measurement and counting period; $PRB_{avg}(T)$ represents the average number of uplink/downlink PRBs used in each TTI in the measurement and counting period; PRB(T) represents the cumulative number of uplink/downlink PRBs used in all TTIs in the measurement and counting period; P(T) represents the number of TTIs occupied by uplink/downlink in the measurement and counting period. |

TABLE 6

Statistics of Average Uplink/Downlink PRB Utilization Rate For MU MIMO and SU MIMO Respectively and Collectively

| | |
|---|---|
| Protocol layer: | MAC layer |
| Use cases: | Physical Resource Division of Network Slices |
| Value range: | 0 to 100% |
| Optional/Mandatory: | Optional |
| Calculation method | In the O1 or E2 measurement and counting period, calculate an average value of number of PRBs used in uplink/downlink monitoring slices in each TTI, which is obtained according |

TABLE 6-continued

Statistics of Average Uplink/Downlink PRB Utilization Rate
For MU MIMO and SU MIMO Respectively and Collectively

| | |
|---|---|
| | to statistics of actual transmission situation of a cell, the reference point is a service access point between MAC and L1, an average value of a ratio of the number of PRBs of downlink MU-MIMO to total number of PRBs of slices in this cell |
| Definition | $R(T) = [PRB_{total}(T)/PRB_{available}(T) * 100]$ (Expression 3) Herein, T represents a measurement and counting period; $PRB_{total}(T)$ represents the cumulative number of uplink/downlink PRBs used in the measurement and counting period; $PRB_{available}(T)$ represents the number of all of available uplink/downlink PRBs in the measurement and counting period. |

TABLE 7

Statistics of Average Uplink/Downlink Throughput for
MU MIMO and SU MIMO Respectively and Collectively

| | |
|---|---|
| Protocol layer: | MAC layer |
| Use cases: | Physical Resource Division of Network Slices |
| Value range: | |
| Optional/Mandatory: | Optional |
| Calculation method | Is the O1 or E2 measurement and counting period, calculate a size of data successfully transmitted, which is obtained according to statistics of actual transmission situation of a cell, the reference point is a service access point between MAC and L1. |
| Definition | $Tput = B_{transfer}(T) - B_{padding}(T)$ (Expression 4) Herein, T represents a measurement and counting period; $T_{put}(T)$ represents a size of valid data of MU-MIMO/SU-MIMO data blocks successfully transmitted within the measurement and counting period; $B_{transfer}(T)$ represents a total size of MU-MIMO/SU-MIMO data blocks successfully transmitted in the measurement and counting period; $B_{padding}(T)$ represents a size of invalid padding data of MU MIMO/SU-MIMO data blocks successfully transmitted in the measurement statistics period. |

Those of ordinary skill in the art can realize that units and algorithm steps of each example described in connection with embodiments of the present disclosure can be implemented in electronic hardware, or a combination of computer software and electronic hardware. Whether these functions are implemented in hardware or software depends on specific application and design constraints of the technical scheme. Professionals can use different methods to implement the described functions for each specific application, but such implementation should not be considered as beyond the scope of the present disclosure. In the present disclosure, the SMO entity and the O-RAN network functional entity may be also implemented as a device including a processor and a communication interface for transmitting and receiving data, respectively.

The basic principles of the present disclosure have been described above in connection with specific embodiments. However, it should be pointed out that benefits, advantages and effects mentioned in the present disclosure are only examples and not limitations, and these benefits, advantages and effects cannot be considered as necessary for various embodiments of the present disclosure. In addition, the specific details disclosed above are only for the purpose of illustration and easy understanding, but not for limitation. The above details do not limit the disclosure to the fact that it must be realized with the above specific details.

It should also be pointed out that in the system and method of the present disclosure, each component or step can be decomposed and/or recombined. These decompositions and/or re-combinations should be regarded as equivalents of the present disclosure.

Various changes, substitutions and modifications to the techniques described herein may be made without departing from the taught techniques defined by the appended claims. In addition, the scope of claims of the present disclosure is not limited to specific aspects of the composition, means, methods and actions of the processes, machines, manufacturing, events described above. Composition, means, methods and actions of the processes, machines, manufacturing, events which currently exist or are to be developed later, that perform substantially the same functions or achieve substantially the same results as the corresponding aspects described herein, can be utilized. Therefore, the appended claims include such composition, means, methods or actions of the processes, machines, manufacturing, or events within their scope.

The above description of aspects of the disclosure is provided to enable any person skilled in the art to make or use the disclosure. Various modifications to these aspects will be readily apparent to those skilled in the art, and the general principles defined herein can be applied to other aspects without departing from the scope of the present disclosure. Therefore, the disclosure is not intended to be limited to the aspects shown herein, but is to be accorded the widest scope consistent with the principles and novel features disclosed herein.

The above description has been given for purposes of illustration and description. Furthermore, this description is not intended to limit embodiments of the disclosure to the forms disclosed herein. Although several example aspects and embodiments have been discussed above, those skilled in the art will recognize certain variations, modifications, changes, additions and sub-combinations thereof.

What is claimed is:

1. A method for supporting a multiple-input multiple-output (MIMO) by a service management and orchestration (SMO) entity including a non-real time radio access network (RAN) intelligent controller (non-RT RIC) in a communication system using an open radio access network (O-RAN), the method comprising:
receiving, from a first entity, first data, the first entity including at least one of an O-RAN centralized unit (O-CU) or an O-RAN distributed unit (O-DU), the first data including MIMO related information collected from the first entity;
determining, based on the first data, a configuration for at least one of a single-user-multiple-input-multiple-output (SU-MIMO) or a multi-user-multiple-input-multiple-output (MU-MIMO); and
transferring, to a second entity including a near-real time RAN intelligent controller (near-RT RIC) that controls the first entity in the O-RAN, information on the configuration,
wherein the MIMO related information comprises capability information related to the first entity, and
wherein the capability information related to the first entity comprises at least one of a maximum layer number of the SU-MIMO, a maximum layer number of the MU-MIMO, or sounding reference signal (SRS) related information.

2. The method of claim 1, wherein the configuration is determined by using an artificial intelligence (AI)/machine learning (ML) model trained based on the first data.

3. The method of claim 1, wherein the MIMO related information further comprises at least one of capability information related to a user equipment (UE) or statistical information on the at least one of the SU-MIMO or the MU-MIMO.

4. The method of claim 3, wherein the capability information related to the UE comprises at least one of capability information on a demodulation reference signal (DMRS), capability information on a codebook, or SRS related information.

5. The method of claim 3, wherein the statistical information on the at least one of the SU-MIMO or the MU-MIMO comprises at least one of an average number of uplink/downlink transmission layers of the SU-MIMO or the MU-MIMO, an average number of uplink/downlink physical resource blocks (PRBs) of the SU-MIMO or the MU-MIMO, an average uplink/downlink PRB utilization rate of the SU-MIMO or the MU-MIMO, or an average uplink/downlink throughput of the SU-MIMO or the MU-MIMO.

6. The method of claim 1, further comprising;
receiving, from an application server, second data including at least one of velocity and location related information or traffic related information collected by the application server,
wherein the determining comprises determining, based on the first data and the second data, the configuration for applying at least one of the SU-MIMO or the MU-MIMO.

7. A service management and orchestration (SMO) entity supporting a multiple-input multiple-output (MIMO) including a non-real time radio access network (RAN) intelligent controller (non-RT RIC) in a communication system using an open radio access network (O-RAN), the SMO entity including a controller that is configured to:
receive, from a first entity, first data, the first entity including at least one of an O-RAN centralized unit (O-CU) or an O-RAN distributed unit (O-DU), the first data including MIMO related information collected from the first entity,
determine, based on the first data, a configuration for at least one of a single-user-multiple-input-multiple-output (SU-MIMO) or a multi-user-multiple-input-multiple-output (MU-MIMO), and
transfer, to a second entity including a near-real time RAN intelligent controller (near-RT RIC) that controls the first entity in the O-RAN, information on the configuration,
wherein the MIMO related information comprises capability information related to the first entity, and
wherein the capability information related to the first entity comprises at least one of a maximum layer number of the SU-MIMO, a maximum layer number of the MU-MIMO, or sounding reference signal (SRS) related information.

8. The SMO entity of claim 7, wherein the controller is configured to determine the configuration using an artificial intelligence (AI)/machine learning (ML) model trained based on the first data.

9. The SMO entity of claim 7, wherein the MIMO related information further comprises at least one of capability information related to a user equipment (UE) or statistical information on the at least one of the SU-MIMO or the MU-MIMO.

10. The SMO entity of claim 9, wherein the capability information related to the UE comprises at least one of capability information on a demodulation reference signal (DMRS), capability information on a codebook, or SRS related information.

11. The SMO entity of claim 9, wherein the statistical information on the at least one of the SU-MIMO or the MU-MIMO comprises at least one of an average number of uplink/downlink transmission layers of the SU-MIMO or the MU-MIMO, an average number of uplink/downlink physical resource blocks (PRBs) of the SU-MIMO or the MU-MIMO, an average uplink/downlink PRB utilization rate of the SU-MIMO or the MU-MIMO, and an average uplink/downlink throughput of the SU-MIMO or the MU-MIMO.

12. The SMO entity of claim 7, wherein the controller is further configured to receive, from an application server, second data including at least one of velocity and location related information or traffic related information collected by the application server,
wherein the controller is configured to determine the configuration for applying at least one of the SU-MIMO or the MU-MIMO, based on the first data and the second data.

13. A method for supporting a multiple-input multiple-output (MIMO) by an open radio access network (O-RAN) entity including a near-real time RAN intelligent controller (near-RT RIC) in a communication system using an open radio access network (O-RAN), the method comprising:
obtaining information on a trained artificial intelligence (AI)/machine learning (ML) model deployed from a service management and orchestration (SMO) entity including a non-real time RAN intelligent controller (non-RT RIC);
determining, based on the trained AI/ML model using first data, a configuration for applying at least one of a single-user-multiple-input-multiple-output (SU-MIMO) or a multi-user-multiple-input-multiple-output (MU-MIMO), the first data including MIMO related information; and
transferring, to a first entity, information on the configuration, the first entity including at least one of an O-RAN centralized unit (O-CU) or an O-RAN distributed unit (O-DU),
wherein the MIMO related information comprises capability information related to the first entity, and
wherein the capability information related to the first entity comprises at least one of a maximum layer number of the SU-MIMO, a maximum layer number of the MU-MIMO, or sounding reference signal (SRS) related information.

14. The method of claim 13, wherein the MIMO related information further comprises at least one of capability information related to a user equipment (UE) or statistical information on the at least one of the SU-MIMO or the MU-MIMO.

15. The method of claim 14, wherein the capability information related to the UE comprises at least one of capability information on a demodulation reference signal (DMRS), capability information on a codebook, or SRS related information.

16. The method of claim 14, wherein the statistical information on the at least one of the SU-MIMO and the MU-MIMO comprises at least one of an average number of uplink/downlink transmission layers of the SU-MIMO or the MU-MIMO, an average number of uplink/downlink physical resource blocks (PRBs) of the SU-MIMO or the MU-MIMO, an average uplink/downlink PRB utilization rate of the SU-MIMO or the MU-MIMO, or an average uplink/downlink throughput of the SU-MIMO or the MU-MIMO.

17. An open radio access network (O-RAN) entity supporting a multiple-input multiple-output (MIMO) in a communication system using an O-RAN, the O-RAN entity including a near-real time RAN intelligent controller (near-RT RIC) configured to:
obtain information on a trained artificial intelligence (AI)/machine learning (ML) model deployed from a service management and orchestration (SMO) entity including a non-real time RAN intelligent controller (non-RT RIC),
determine, based on the trained AI/ML model using first data, a configuration for applying at least one of a single-user-multiple-input-multiple-output (SU-MIMO) or a multi-user-multiple-input-multiple-output (MU-MIMO), the first data including MIMO related information, and
transfer, to a first entity, information on the configuration, the first entity including at least one of an O-RAN centralized unit (O-CU) and an O-RAN distributed unit (O-DU),
wherein the MIMO related information comprises capability information related to the first entity, and
wherein the capability information related to the first entity comprises at least one of a maximum layer number of the SU-MIMO, a maximum layer number of the MU-MIMO, or sounding reference signal (SRS) related information.

* * * * *